(12) United States Patent
Bingham et al.

(10) Patent No.: US 11,993,454 B2
(45) Date of Patent: May 28, 2024

(54) VENT ASSEMBLY

(71) Applicant: ELMAC TECHNOLOGIES LIMITED, Flintshire (GB)

(72) Inventors: Lewis Bingham, Flintshire (GB); Daomin Hong, Flintshire (GB)

(73) Assignee: ELMAC TECHNOLOGIES LIMITED, Flintshire (GB)

( * ) Notice: Subject to any disclaimer, the term of this patent is extended or adjusted under 35 U.S.C. 154(b) by 1074 days.

(21) Appl. No.: 16/757,474

(22) PCT Filed: Oct. 22, 2018

(86) PCT No.: PCT/GB2018/053046
§ 371 (c)(1),
(2) Date: Apr. 20, 2020

(87) PCT Pub. No.: WO2019/077377
PCT Pub. Date: Apr. 25, 2019

(65) Prior Publication Data
US 2021/0188539 A1    Jun. 24, 2021

(30) Foreign Application Priority Data

Oct. 20, 2017  (GB) ...................................... 1717254

(51) Int. Cl.
*B65D 90/34*        (2006.01)
*A62C 4/00*         (2006.01)
(Continued)

(52) U.S. Cl.
CPC ................ *B65D 90/34* (2013.01); *A62C 4/00* (2013.01); *A62C 4/04* (2013.01); *E04F 17/026* (2013.01); *F16K 24/04* (2013.01); *F23L 17/02* (2013.01)

(58) Field of Classification Search
CPC . A62C 4/00; A62C 4/04; E04F 17/026; F23L 17/02; F16K 24/04; B65D 90/35
(Continued)

(56) References Cited

U.S. PATENT DOCUMENTS

| 852,480 A   | * | 5/1907 | Whitehead | ............... | F24L 17/20  |
|             |   |        |           |                 | 454/36      |
| 2,157,609 A | * | 5/1939 | Hopkins   | ............... | B61D 27/009 |
|             |   |        |           |                 | 415/208.1   |

(Continued)

FOREIGN PATENT DOCUMENTS

| CN | 201740042 U | 2/2011  |
| FR | 2304365 A1  | 10/1976 |

(Continued)

OTHER PUBLICATIONS

PCT/GB2018/053046—International Search Report, dated Feb. 8, 2019.

(Continued)

*Primary Examiner* — Avinash A Savani
*Assistant Examiner* — Dana K Tighe
(74) *Attorney, Agent, or Firm* — Curatolo Sidoti & Trillis Co., LPA; Floyd Trillis, III; Salvatore A. Sidoti

(57) ABSTRACT

A vent assembly (200) comprises a housing (13), a flow conduit (10) and a weather hood (12), the flow conduit (10) having a proximal end (10A) for being fluidly connected to a source of material and an open distal end (10B), the housing (13) having a base portion (13A), a side wall portion (13B), and a top portion (13C), the flow conduit (10) comprising a baffle (12E) located between the base portion (13A) and the top portion (13C) of the housing (13) to direct fluid flowing from the flow conduit (10) towards the weather hood (12) and through the housing (13) in a direction towards the top portion (13C) of the housing (13).

17 Claims, 8 Drawing Sheets

(51) Int. Cl.
  *A62C 4/04* (2006.01)
  *E04F 17/02* (2006.01)
  *F16K 24/04* (2006.01)
  *F23L 17/02* (2006.01)

(58) Field of Classification Search
  USPC .......................................................... 454/36
  See application file for complete search history.

(56) References Cited

U.S. PATENT DOCUMENTS

| | | | | | |
|---|---|---|---|---|---|
| 2,753,786 | A | * | 7/1956 | White | F23L 17/02 |
| | | | | | 454/36 |
| 2,803,184 | A | * | 8/1957 | Wasserman | F23L 17/02 |
| | | | | | 454/367 |
| 3,398,671 | A | * | 8/1968 | Acosta | E04D 13/1471 |
| | | | | | 126/307 R |
| 4,000,688 | A | * | 1/1977 | Malott | F24F 7/02 |
| | | | | | 454/367 |
| 4,147,096 | A | * | 4/1979 | Caswell | F16K 24/04 |
| | | | | | 137/533.27 |
| 5,662,522 | A | * | 9/1997 | Waltz | F24F 7/02 |
| | | | | | 454/367 |
| 5,749,780 | A | * | 5/1998 | Harder | F24F 7/02 |
| | | | | | 236/49.5 |
| 2002/0137454 | A1 | | 9/2002 | Baker | |

FOREIGN PATENT DOCUMENTS

| | | |
|---|---|---|
| GB | 225 047 A | 11/1924 |
| GB | 438 489 A | 11/1935 |
| GB | 448 285 A | 6/1936 |
| WO | WO 2015/114335 A1 | 8/2015 |
| WO | WO 2016/051209 A1 | 4/2016 |
| WO | WO 2018/211266 A1 | 11/2018 |

OTHER PUBLICATIONS

PCT/GB2018/053046—International Written Opinion, dated Feb. 8, 2019.
GB1717254.5—Great Britain Search Report, dated Apr. 23, 2018.

* cited by examiner

VENT ASSEMBLY

CROSS REFERENCE TO RELATED APPLICATIONS

This application is a national stage application of International Application No. PCT/GB2018/053046, filed Oct. 22, 2018, which claims priority from Great Britain Patent Application No. 1717254.5, filed Oct. 20, 2017, all of which applications are incorporated herein by reference.

This invention relates to vent assemblies and, in particular, to a vent assembly, for example a vertical vent assembly, for a flow conduit.

Many installations require vent assemblies. An example of such an installation is a tank in which volatile liquids are stored. In such tanks, the headspace above the liquid may become saturated with vapour. It is often beneficial to allow the vapour to vent to atmosphere in a free or controlled manner. To do so it is known to use a vent assembly. The vent assembly may be coupled to, or provided with, a flow conduit to fluidly connect the source of vapour to the assembly.

It is known to provide vent assemblies with flame arresters.

Flame arresters are provided with flame arrester elements which are arranged to prevent the transmission of a flame. Flame arresters may be static or dynamic with the static type being those which are arranged to prevent flame transmission by virtue of the provision of quenching gaps in the flame arrester element. Suitable materials for flame arrester elements include crimped ribbon which is spooled to provide plural parallel passageways. Other materials are also known for the fabrication of flame arrester elements.

Flame arresters are typically formed as in-line flame arresters where the flame arrester is provided with two pipe connections, one on each side (ISO 16852 s 3.22) and end-of-line (EOL) flame arresters where the flame arrester is fitted with one pipe connection only (ISO 16852 s 3.21). Where provided, vent assemblies tend to utilise EOL flame arresters although in-line flame arresters are known.

As stated above, many tanks are fitted with vent pipes to prevent an overpressure developing within the tank. Vent pipes typically extend vertically from the tank or from pipework attached to the tank. If the tank is arranged to store flammable or volatile material it is usual and often necessary to fit the vent pipe with an EOL flame arrester. An example of such a tank is an above ground fixed storage tank for the storage of flammable or volatile liquids. Other constructions are also provided with EOL flame arresters.

Vent assemblies, and especially those provided with EOL flame arresters, are typically located at an elevated position. In order to prevent precipitation and other debris from falling into the flow conduit, and/or on to the flame arrester element, which might clog the flame arrester element or increase the pressure drop across the flame arrester element, it is usual to provide a weather hood. A weather hood is usually a cowl or inverted cup-shaped member mounted above the flow conduit or flame arrester element and with a transverse dimension (e.g. a diameter) larger than that of the flow conduit or flame arrester element so as to shield the flow conduit or flame arrester from precipitation and falling or blown debris.

As will be appreciated, for a weather hood to effectively shield the flow conduit or flame arrester element from precipitation, it is necessary to provide a weather hood which is sufficiently sized and closely located to the vent pipe to provide an effective shield.

As will be further appreciated as fluid flows out of a vertically-oriented vent assembly or EOL flame arrester the fluid flows vertically upwards. The provision of an effective weather hood will alter the vertical passage of the outflowing fluids and cause that fluid to experience a downward flow (or at least a vector component of a downward flow).

In situations where vent pipes are connected to tanks holding volatile, noxious and/or flammable materials it is usual to determine a safe working zone around the pipe. Clearly, it would be beneficial to have as small as safe working zone as possible so that the surrounding area need not be cordoned off or otherwise subject to exclusion.

FR2304365 discloses a flame arrester with a weather hood mounted in a housing shaped to cause a certain flow to egressing fluids. The housing will result in a significantly restricted flow. Moreover, although the flame arrester is provided with a weather hood it is understood that due to the construction it will not be effective in all precipitation conditions and precipitation will be allowed to contact the flame arrester element and/or the flow conduit.

The present invention seeks to at least partially mitigate the issues found in the prior art.

In a first aspect of the invention there is provided, a vent assembly in accordance with Claim 1.

In a further aspect of the invention there is provided a vent assembly comprising a housing, a flow conduit and a weather hood, the flow conduit having a proximal end for being fluidly connected to a source of material and an open distal end, the housing having a base portion, a side wall portion, and a top portion, the flow conduit comprising a baffle to direct fluid flowing from the flow conduit towards the weather hood and through the housing in a vertical direction and towards the top portion of the housing.

The baffle acts to reverse the flow of fluid which would otherwise be directed downwardly under the action of the weather hood on the fluid egressing the conduit.

Advantageously the vent assembly will encourage or direct an upward flow of fluid from the flow conduit at least a portion of which would otherwise flow downwardly due to the presence of a weather hood. The open top encourages quick and effective venting from the housing so that there is not a substantial build-up of outflow gases within the housing. Clearly, if the fluid flowing out from a conduit is moving in a vertical and/or upwards direction the safe working zone is likely to be closer to the venting location than if the fluid flowing out from the pipe is moving in a downwards direction.

The baffle may direct fluid flowing from the flow conduit in a vertical direction and towards the top portion of the housing and, in embodiments, to the periphery of the top portion of the housing.

The base portion of the housing may be at least substantially closed, or may be at least substantially open (i.e. fluidly non-occluded). In embodiments, the base portion may comprise one or more drainage ports. The drainage ports may be, for example simple apertures or may be formed by or between an array of internally radiating supports, the space between adjacent supports providing said drainage ports. The drainage ports are useful because they prevent the build-up of liquids (e.g. precipitation) which would otherwise be retained by the housing. The base portion, and/or at least those parts of the base portion which are substantially open may comprise a gauze material, which may function as a bird screen.

Because the baffle causes an upward flow of fluid, the bottom portion of the housing may be open. This is advantageous because it reduces weight, provides drainage and/or provides for a throughflow of air from the bottom toward the top portion of the housing.

In embodiments, the side wall portion may extend from the periphery of the base portion. The drainage ports may be located at or towards the periphery of the base portion. The base portion of the housing may comprise an array of internally radiating supports, between adjacent supports are provided said drainage ports. The drainage port or some or all of the drainage ports may be provided with one-way valves. The side wall portion is preferably planar, for example extending in a direction parallel to a principal flow direction of fluid egressing the distal end of the flow conduit. The side wall portion may define a shape of constant cross-section. Advantageously, such a side wall portion, and the associated housing, is easy to construct and install.

The top portion of the housing may be an open top or it may be covered, at least in part by a perforate member such as a gauze or mesh. The top portion may function as a bird screen. This will help to prevent leaves or other debris from falling into the housing. The gauze or mesh may be heated, for example, using a steam jacket or other appropriate means, so that frost, ice or snow which is on or in the gauze or mesh can be melted.

The weather hood may be provided by a solid portion, which may extend across a portion of the open top. The solid portion may present a convex surface to fluid flowing from the flow conduit. If present, the solid portion may be attached to the side wall and may be symmetrically located in relation to the side wall. In an embodiment, the solid portion may have a depending wall formed at or towards its periphery. The weather hood has a periphery larger than the distal end of the flow conduit, for example the weather hood has a minimum transverse dimension which is larger than a maximum transverse dimension across the flow conduit, for example at the distal end of the flow conduit.

The weather hood may have a first flow conduit facing face and a second environment facing face. In embodiments, the flow conduit facing face of the weather hood may be substantially flat, and the environment facing face of the weather hood may be substantially flat. In other embodiments, the flow conduit facing face of the weather hood may be convex and the environment facing face of the weather hood may be concave or may be flat.

The weather hood may further comprise a drainage channel or tube in communication with the environment facing face. Plural drainage channels or tubes may be provided.

The weather hood may be attached to the side wall of the housing, e.g. connected by one or more spokes, arms and/or support bars. The or a space between said spokes, arms and/or support bars may be provided with a perforate member. The weather hood may be symmetrically located in relation to the side wall.

The weather hood may have a depending wall formed at or towards its periphery. The weather hood, for example the depending wall of the weather hood, may be provided with a secondary baffle, which may be outwardly directed. The secondary baffle may extend outwardly around the weather hood, for example around the entire depending wall of the weather hood. The internal angle defined between the depending wall and the secondary baffle may be acute.

Advantageously, in use, the secondary baffle both provides means to direct flow, for example by deploying the Coanda effect, and/or provides a reservoir for the receipt of fluid, for example precipitation. The terminal edge of the baffle (i.e. the distal edge) may provide a weir over which collected water can overflow. The terminal edge of the baffle may comprise a lip or an edge portion.

The secondary baffle may be connected to the depending wall at a juncture. Preferably the juncture of the secondary baffle and the depending wall is smooth and curved which, advantageously will help with flow.

The secondary baffle may comprise one or more drainage apertures for drainage of rain water that flows into the housing. Advantageously, this allows water from environmental conditions to flow away from the flow conduit to prevent damage.

As will be appreciated the vent assembly having a flow conduit, baffle, weather hood, and housing defines a flow path for fluid egressing from the flow conduit into the atmosphere, in which the flow path vents to the atmosphere in a substantially vertical, upward direction.

The baffle preferably extends about the entire periphery (e.g. circumferentially) of the flow conduit.

In embodiments, the baffle extends outwardly around the entire side wall and the internal angle defined between the flow conduit and the baffle may be acute. For example, the baffle may taper outwardly from the flow conduit towards, to or beyond the distal end of the flow conduit.

The flow conduit may comprise a simple pipe with a constant cross section or may comprise a body which flares outwardly or inwardly towards the distal end from a tubular portion of constant cross section.

The flow conduit may be provided with a flange. The flange may be provided at or adjacent the distal end of the flow conduit. The baffle may be secured to the flow conduit at the flange. Alternatively, the baffle may be secured to a side wall portion of the flow conduit, located between the proximal and distal ends of the conduit.

The baffle may be provided with or comprise one or more baffle drainage ports. The or each baffle drainage port may be, for example simple apertures, for example formed as a gap or space between the flow conduit and the baffle or may be formed by or between an array of internally radiating supports, the space between adjacent supports providing said baffle drainage ports. The baffle drainage ports are useful because they prevent the build-up of liquids (e.g. precipitation) which would or could otherwise be retained by the baffle. Alternatively, the baffle may provide a weir over which retained liquids can flow.

In embodiments, the vent assembly may further comprise a flame arrester assembly. The flame arrester assembly may be one known to those skilled in the art. The flame arrester assembly, comprising a flame arrester element, may be located at or proximate the distal end of the flow conduit. Additionally or alternatively, the vent assembly may be provided with one or more of a pressure relief valve (PRV), vacuum relief valve (VRV) or a pressure and vacuum release valve (PVRV).

A further aspect of the invention provides a vent assembly comprising a flow conduit having a principal flow axis, a housing and a weather hood, wherein the weather hood is mounted above a distal end of the flow conduit for preventing precipitation and/or debris from falling into the flow conduit, the weather hood comprising a top portion and an optional peripheral wall extending towards but outboard of the flow conduit, the flow conduit and/or the weather hood having a baffle.

The baffle may be arranged to direct fluid flowing out of the flow conduit, in a direction substantially parallel to said principal flow axis.

In this specification, a direction substantially parallel means a direction with at least a vector component in a direction parallel to the flow axis.

In order that the invention may be more fully understood it will now be described, by way of example only, and with reference to the accompanying drawings, in which.

Figure 1A:
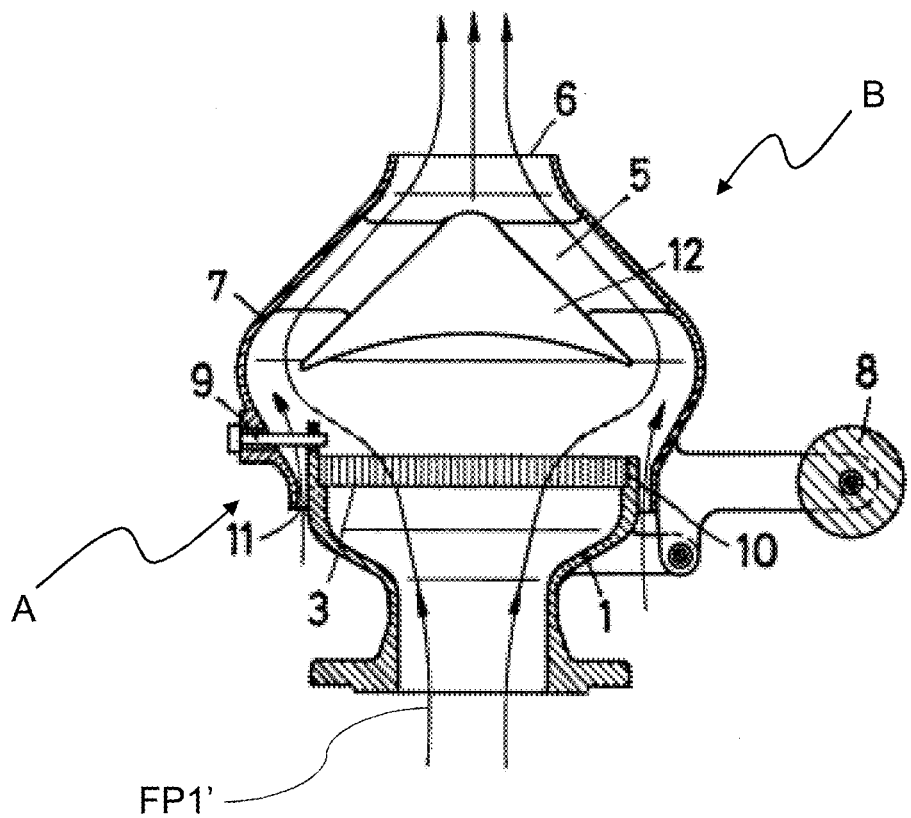
FIG. 1A is a vent assembly of the prior art.

Referring first to FIG. 1A, there is shown a flame arrester A and a housing B of the prior art. The flame arrester A and the housing B in combination comprise a flow conduit 1, a flame arrester assembly 3, and a weather hood 12. The housing B further comprises an annular suction passage 11. The housing B has a flow cross-section which tapers upwards in the manner of an injector or a diffuser, which opens into an outlet open at the top.

A flow path FP1' of fluid venting into the atmosphere (out-breathing mode) from the flame arrester A and housing B is illustrated with the series of arrows.

In use, the weather hood 12 protects the flame arrester assembly 3 from atmospheric conditions such as direct precipitation. The annular suction passage 11 allows for fresh air to enter the housing B. The housing B and the weather hood 12 are closely matched in shape so as to seek to provide a 'jet effect'. This is may impede performance of the flame arrester A by providing a flow restriction. Moreover, rain water may enter the flame arrester assembly 3 in extreme weather conditions. During heavy rain, rain water will enter into the top open and hit the outer surface of the weather hood 12 and then travel down along the outer surface. Due to the effect of gravity, the velocity of the flowing water significantly increases at the lower edge of the weather hood. The flowing water will hit the inner surface of the housing 7 and at least some of water will enter into the flame arrester element 3 and further, the piping work 1.

Figure 1B:
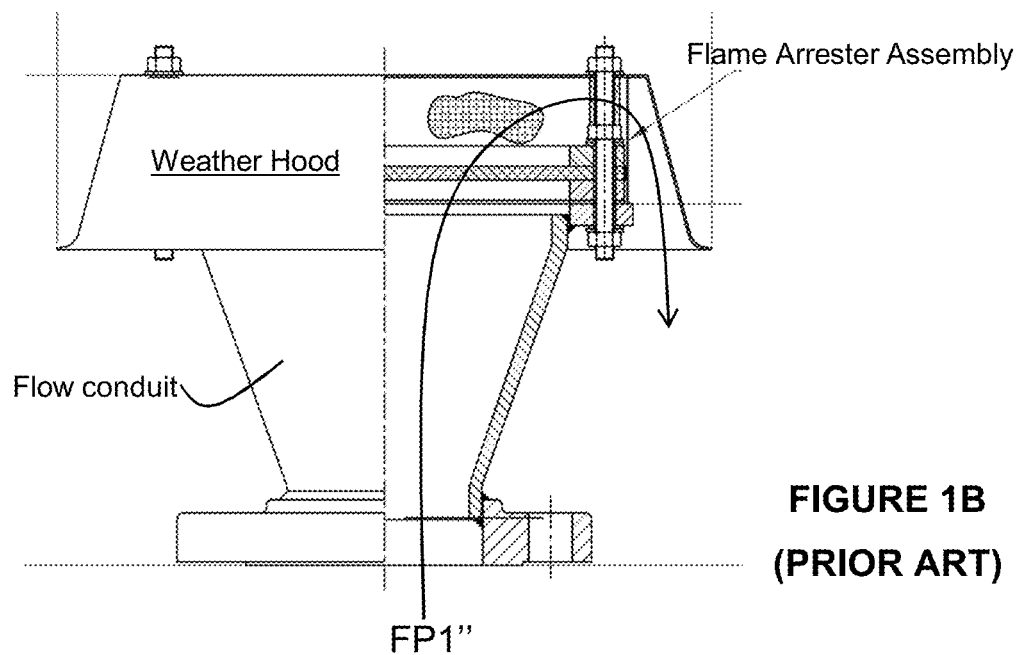
FIG. 1B is a further vent assembly of the prior art.

Referring now to FIG. 1B there is shown a prior art vent assembly comprising a flow conduit provided with a flame arrester and a weather hood. The flow direction of gas venting via the vent assembly is indicated at FP1". As will be appreciated, the weather hood causes a generally downward flow of egressing fluid.

Figure 2:
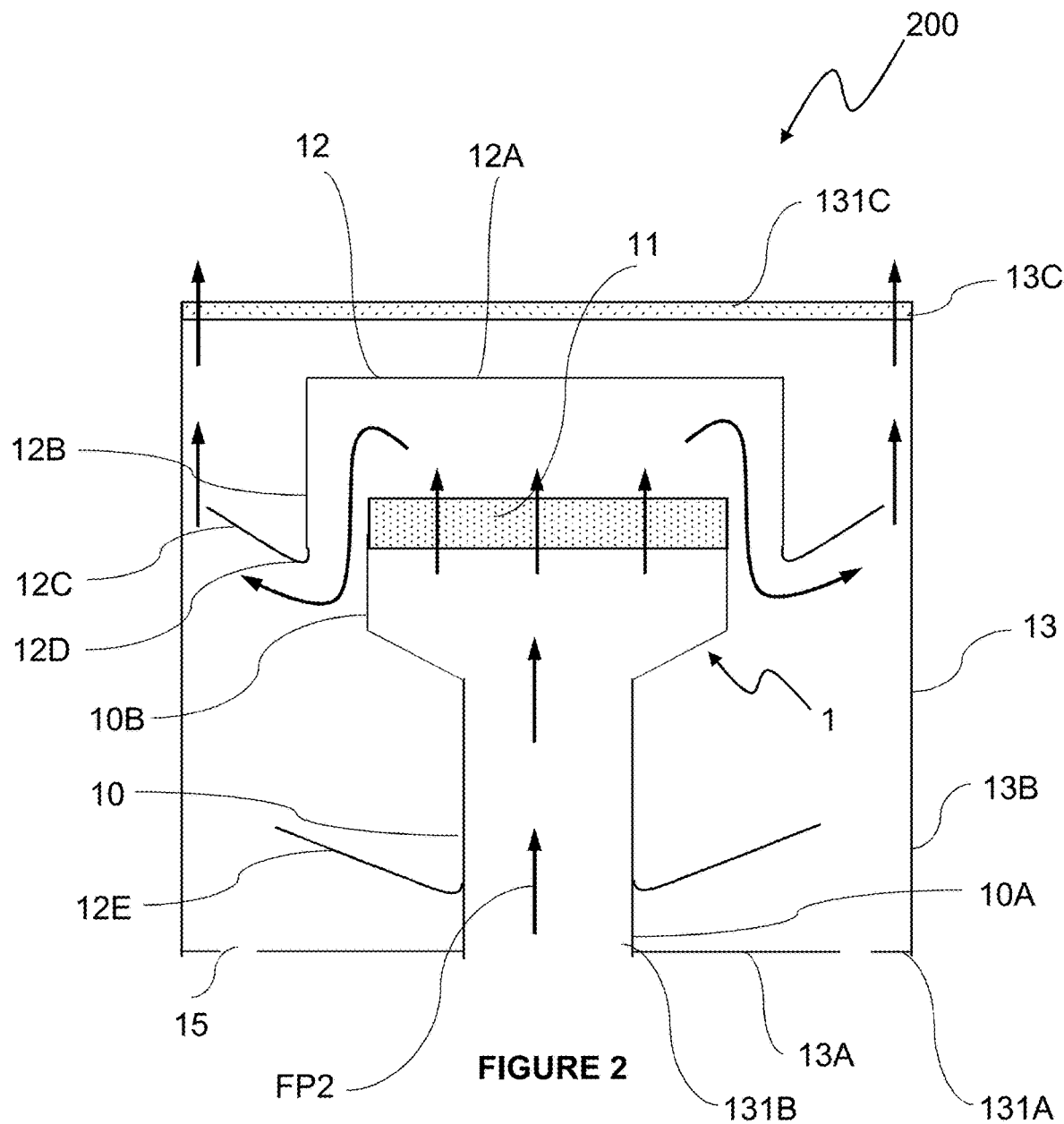
FIG. 2 is a schematic sectional view of a first embodiment of a vent assembly according to the invention.

Referring now to FIG. 2, there is shown a vent assembly 200 according to the first embodiment of the invention. The vent assembly 200 comprises a flow conduit 10, a weather hood 12, and a housing 13. A so called 'end-of-line' (EOL) flame arrester 1 is optionally provided. The flame arrester 1 comprises a flame arrester assembly 11.

The flow conduit 10 comprises a proximal end 10A for connection to a source of material to be vented (for example a tank having associated venting pipework) and a distal end 10B. In this embodiment, the flow conduit 10 is cylindrical in shape and flares outwardly towards the distal end but may be any other suitable shape. The proximal end 10A is configured to be secured to the end of a line, e.g. to a tank or to a pipe (not shown) via suitable means, e.g. flanges and bolts.

The flame arrester assembly 11 may be any suitable flame arrester assembly known to those skilled in the art. The flame arrester assembly 11 will typically comprise a flame arrester element (not shown), which is permeable to permit fluid to flow in either direction, into or out of the vent assembly 200. The flame arrester 1 may be secured to a flange (not shown) provided at the distal end 10B of the flow conduit 10.

The weather hood 12 comprises a planar top or shield portion 12A from the periphery of which depends a peripheral skirt portion 12B. Extending from the distal or terminal edge of the peripheral skirt portion 12B is an optional peripheral baffle 12C. The peripheral baffle 12C extends endlessly around the circumference of the skirt portion 12B of the weather hood 12 and extends away from the skirt portion 12B so as to define an acute included angle therebetween. The juncture 12D of the peripheral baffle 12C and skirt portion 12B is preferably curved. The peripheral baffle 12C may be integrally formed with the weather hood 12 or may be provided on a separate part and be secured to the weather hood 12 using appropriate securing means. In embodiments, the peripheral baffle 12C may be absent. In this case, the transverse dimension of the shield portion 12A is greater than the transverse dimension of the flame arrester assembly 11 to such an extent that it provides a shield in all weather conditions. If the peripheral baffle 12C is present it will typically be provided with a short skirt (not shown) depending from its terminal edge to prevent or inhibit overflowing water from running along the under-surface of the baffle 12C. Additionally or alternatively a drainage channel or pipe may be provided, extending from the juncture 12D to the outside of housing 13.

The weather hood 12 is mounted to the vent assembly 200 and is sized to cover the flow conduit 10 and the flame arrester element (not shown) of the flame arrester assembly 11 (if present). In this embodiment, the weather hood 12 may be formed from steel or other suitable alloys or other materials, such as polymers which are corrosion resistant and/or lightweight.

Turning now to the housing 13 this provides an enclosure for the distal end 10B of the flow conduit 10, the flame arrester 1 (if present) and, in particular, for the flame arrester assembly 11 (if present) and the weather hood 12. The housing 13 comprises a base portion 13A, a side wall 13B, and an optional top portion 13C.

The base portion 13A comprises a base plate 131A which is provided with a central aperture 131B, which is sized and shaped to accommodate the flow conduit 10. The flow conduit 10 extends through the base portion 13A. The side wall 13B of the housing 13 upstands from the base portion 13A. The base plate 131A of the base portion 13A comprises a plurality of drainage ports 15 at or located towards the periphery of the base plate 131A, although they may be located at any position of the base plate 131A. In this embodiment, the drainage ports 15 are apertures within the base portion 13A of the housing 13. Alternatively, the base portion may comprise plural spokes or arms which extend from the flow conduit to the side wall portion, drainage ports being provided between adjacent spokes or arms. The space between one or more adjacent spokes or arms may be occluded with a mesh or gauze material. In another embodiment, the base plate 131A may be a perforate plate or screen.

In this embodiment, the top portion 13C (which is optional) comprises a gauze or mesh screen 131C so as to allow the free flow of fluid into and out of the housing 13 whilst providing a barrier to matter which might otherwise fall into the housing 13.

Importantly, the vent assembly 200 further comprises a baffle 12E. The baffle 12E extends endlessly around the flow conduit 10 at a location between the flame arrester assembly 11 and the base portion 13A of the housing 13, and preferably at a location between the peripheral baffle 12C and the base portion 13A of the housing 13. The baffle 12E may be a separate part that is secured, e.g. seamlessly, to the flow conduit 10 using appropriate securing means, e.g. welding or nuts and bolts with any necessary gaskets.

The baffle 12E may be provided with one or more drainage apertures (not shown) to allow any otherwise-collected water from draining therefrom. The or each drainage aperture may be provided with a flow director to ensure that gas or vapour egressing the distal end 10B of the flow conduit 10 is all directed upwardly by the baffle 12E and is unable to vent via the drainage ports. Alternatively, the drainage port may be connected via a tube or other flow channel to the outside of the vent assembly. The tube may have a non-rectilinear form so as to inhibit the flow of gas, for example a U-tube.

The outer circumference of the baffle 12E is not larger than the outer circumference of the peripheral baffle 12C, i.e. the maximum transverse dimension of the peripheral baffle 12C is wider than the maximum transverse dimension of the baffle 12E.

The vent assembly 200 may be further provided with supporting elements (not shown), e.g. spokes, to support the weather hood 12 on the flame arrester 1 and within the housing 13. The flame arrester 1 and the housing 13 may be secured together by any suitable means, e.g. nuts and bolts.

The weather hood 12 is configured to protect the distal end 10B of the flow conduit 10, and the flame arrester assembly 11 from precipitation and debris ingress into the vent assembly 200. As stated above, the top portion 13C of the housing 13, where provided, inhibits the passage of solid matter into the housing 13.

The flow path FP2 of fluid venting into the atmosphere (out-breathing mode) from the vent assembly 200 is illustrated with a series of arrows.

The flow path FP2 is defined by the flow conduit 10, the weather hood 12, and the housing 13. Fluid may flow freely in either direction, into and/or out of the vent assembly 200 depending upon the pressure difference within the vent assembly 200 in comparison to the atmosphere. It will be appreciated that fluid flowing from the conduit 10 via the flame arrester assembly 11 (if present) and the weather hood 12 has a substantially downward flow direction. The provision of the housing 13 and/or the baffle 12E causes the substantially downward flow exiting the weather hood 12 to revert into a substantially upward flow to exit the housing 13. The provision of a mesh or gauze top portion 131C of the housing 13 does not impede or hinder the egress of fluid from the housing 13 so that a head of fluid is not able to develop within the housing 13.

In use, and in out-breathing mode, fluid flows from its source (not shown) along the flow path FP2 from the flow conduit 10, through the flame arrester assembly 11, and flows along the inner surface of the skirt portion 12B of the weather hood 12, along the peripheral baffle 12C over the curved juncture 12D, and upwards in a vertical flow direction to vent to the atmosphere.

The baffle 12E further encourages the flow path FP2 of fluid in an upwards direction.

The plurality of drainage ports 15 provide an outlet for precipitation that may ingress into the housing 13 during normal use and would otherwise collect therein. In this embodiment, water that ingresses into the vent assembly 200 will either run to the base plate 131A via the annular gap between the peripheral baffle 12C and the side wall 13B of the housing 13 or it will collect in the curved juncture 12D of the peripheral baffle 12C. Once the capacity of the peripheral baffle 12C is reached water will overflow to drain out of the housing 13 via the drainage ports 15. The peripheral baffle 12C may comprise a lip or an edge portion (not shown) to prevent water from flowing along the inner surface of the peripheral baffle 12C toward the flame arrester assembly 11. Alternatively, the water collected by the peripheral baffle 12C may be drained out via a drainage channel or tube (not shown) connected from the 12D to the outside of the housing 13. In this way, the weather hood 12 protects the flame arrester assembly 11 from damage caused by rain water and other foreign objects that may ingress into the vent assembly 200 through the top portion 13C of the housing 13 by providing a pathway for the water and other entrained debris to flow from the housing 13.

It will be appreciated that the baffle 12E extends away from the conduit 10 in an upward direction and so may also collect ingressing or draining water. Water collected by the baffle 12E may overflow the baffle 12E and thence exit the housing 13 via the drainage ports 15.

It is also possible to provide, as the weather hood 12 a flat plate with an optional short peripheral and depending wall 12B. Outboard of the peripheral wall the weather hood may be secured to the housing using struts or spokes with the intervening spaces covered with a mesh or gauze, or a perforate plate.

In an alternative, the weather hood 12 may form part of, and be secured to, the housing 13, for example the weather hood 12 may be secured to the side wall 13B of the housing 13 by radial struts or supports. The space between the side wall 13B and weather hood 12 (for example, between the radial supports or struts) may optionally be covered with a mesh or gauze to prevent debris from falling into the housing 13. In such a case, the top portion 13C may be completely open.

In embodiments, the top portion 13C may be formed from a material that may be heated, for example to melt snow or ice, which may otherwise cover the vent assembly 200 and prevent or inhibit fluid venting.

In the case of a higher pressure within the vent assembly 200 than the surrounding atmosphere, in which fluid flows out of the vent assembly 200 ('out-breathing' mode), the fluid follows path FP2 from its source (not shown), to the flow conduit 10, through the flame arrester element (not shown) of the flame arrester assembly 11, under the skirt portion 12B of the weather hood 12, through the housing 13, and out through the top portion 13C of the housing 13. The configuration of the vent assembly 200 of the present invention is designed to vent fluid into the surrounding atmosphere in a vertical or at least substantially vertical direction.

In the case of a lower pressure within the vent assembly 200 in comparison to the atmosphere, it is also the case that atmospheric air may enter the vent assembly 200 and flow in the opposite direction to that described for flow path FP2 ('in-breathing' mode). Air may also be introduced via the base portion.

The location and shape of the baffle 12E, the skirt portion 12B of the weather hood 12 and the housing 13 are configured to dictate the flow path FP2 of fluid exiting the vent assembly 200. Fluid vents from the vent assembly 200 to the atmosphere in a predominantly upward, vertical direction, to exit the vent assembly 200. This vertical flow is advantageous for safety purposes because it reduces the zoned (hazard) area underneath the vent assembly 200.

Figure 3:
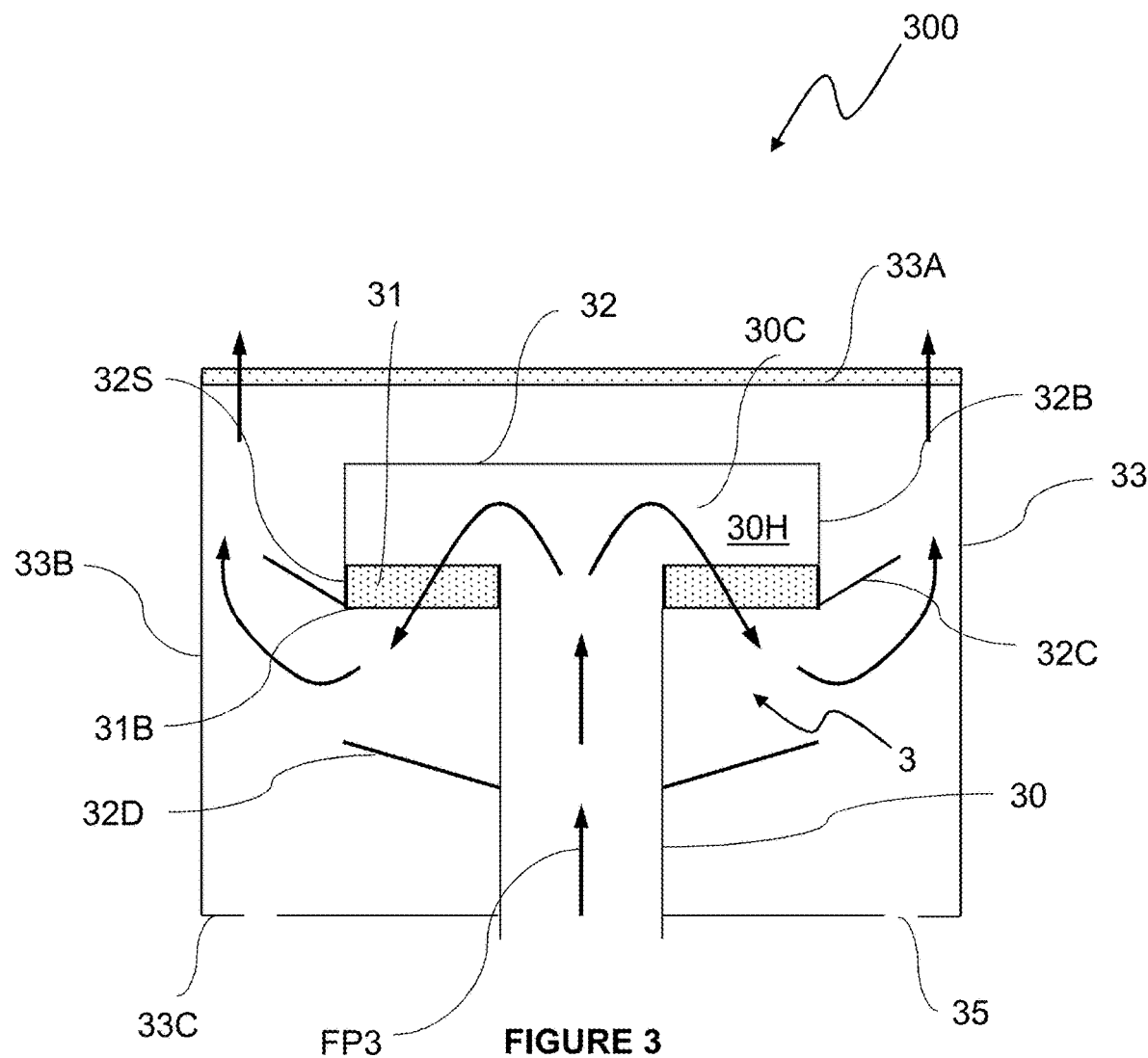
FIG. 3 is a schematic sectional view of a second embodiment of a vent assembly according to the invention.

Referring now to FIG. 3, there is shown a vent assembly 300 according to a second embodiment of the invention. The vent assembly 300 comprises a flow conduit 30, a weather hood 32, and a housing 33. A flame arrester 3 is optionally provided. The flame arrester 3 comprises a flame arrester assembly 31 and a housing portion 30H. The flame arrester 3 is connected to pipework to be vented (not shown) via the flow conduit 30. As before, the terminal portion of the flow conduit 30, the flame arrester assembly 31, and the housing portion 30H (which provides a weather hood 32) are enclosed within the housing 33.

The flame arrester assembly 31 comprises a flame arrester element (not shown) and one or more element supports (not shown).

The housing portion 30H is provided by an upturned cup portion 30C defined by a weather hood 32 and a peripheral wall 32B depending from the weather hood 32. The flow conduit 30 terminates in the housing portion 30H. The flame arrester assembly 31 is located between a terminal portion of the flow conduit 30 and a facing portion of the peripheral wall 32B.

Extending outwardly and upwardly from the peripheral wall 32B of the housing portion 30H is a peripheral and continuous peripheral baffle 32C. The peripheral baffle 32C may comprise a short wall or skirt portion (not shown) depending from its terminal edge to inhibit water from flowing along the under surface of the baffle 32C.

The vent assembly 300 further comprises a baffle 32D. The baffle 32D is secured to the flow conduit 30 using any suitable securing means. The outer circumference of the baffle 32D is not larger than the outer circumference of the peripheral baffle 32C, i.e. the minimum transverse dimension of the peripheral baffle 32C is larger than the maximum transverse dimension of the baffle 32D.

The flow conduit 30 is substantially cylindrical in this embodiment, although may be any other appropriate shape. The housing 33 is connected to the flow conduit 30 using suitable means.

The housing 33 is as shown and described above in relation to the embodiment of FIG. 2 and comprises a base portion 33C, a side wall 33B, and a top portion 33A. The base portion 33C comprises a plurality of drainage ports 35, which may be any appropriate structure and shape. The drainage ports 35 may be located at any point of the base portion 33C, for example at or towards the flow conduit 30 or at or towards the periphery of the base portion 33C. The top portion 33A is preferably mesh or gauze and may or may not be heated The flame arrester element (not shown) of the flame arrester assembly 31 is permeable to fluid flowing in either direction, into or out of the vent assembly 300. The flame arrester element (not shown) is exposed at the base wall 31B of the flame arrester assembly 31, and therefore the base wall 31B is permeable to fluid. The side wall 32B of the flame arrester assembly 31 is impermeable to fluid.

In use, the weather hood 32 protects the flame arrester assembly 31 from water and debris that may ingress into the vent assembly 300.

A flow path FP3 is shown for the flow of fluid out of the vent assembly 300. The flow path FP3 is defined by the flow conduit 30, the housing portion 30H, the baffle 32C, the baffle 32D and the housing 33. In this embodiment, and in out-breathing mode, the fluid flows along the flow path FP3 from the flow conduit 30, to the housing portion 30H in a substantially vertical direction. Upon entering the housing portion 30H, the fluid flow path changes to a downwards direction. The fluid flows along the flow path FP3 through the flame arrester assembly 31 in a downwards direction. The fluid is directed upwardly to exit the housing 33 and into the surrounding atmosphere in a substantially vertical direction by the action of the housing and the baffle 32D. As the fluid flows upwardly, it passes between the terminal edge of the peripheral baffle 32C and the facing wall of the housing 33.

The peripheral baffle 32C provides a reservoir for the collection of precipitation. Once the volume defined by the baffle is filled the water will overflow and contact the housing from where it will drain via drainage ports 35. As stated previously, the baffle 32C may be provided with a short depending skirt portion and/or may be provided with drainage ports and/or channels.

Figure 4:
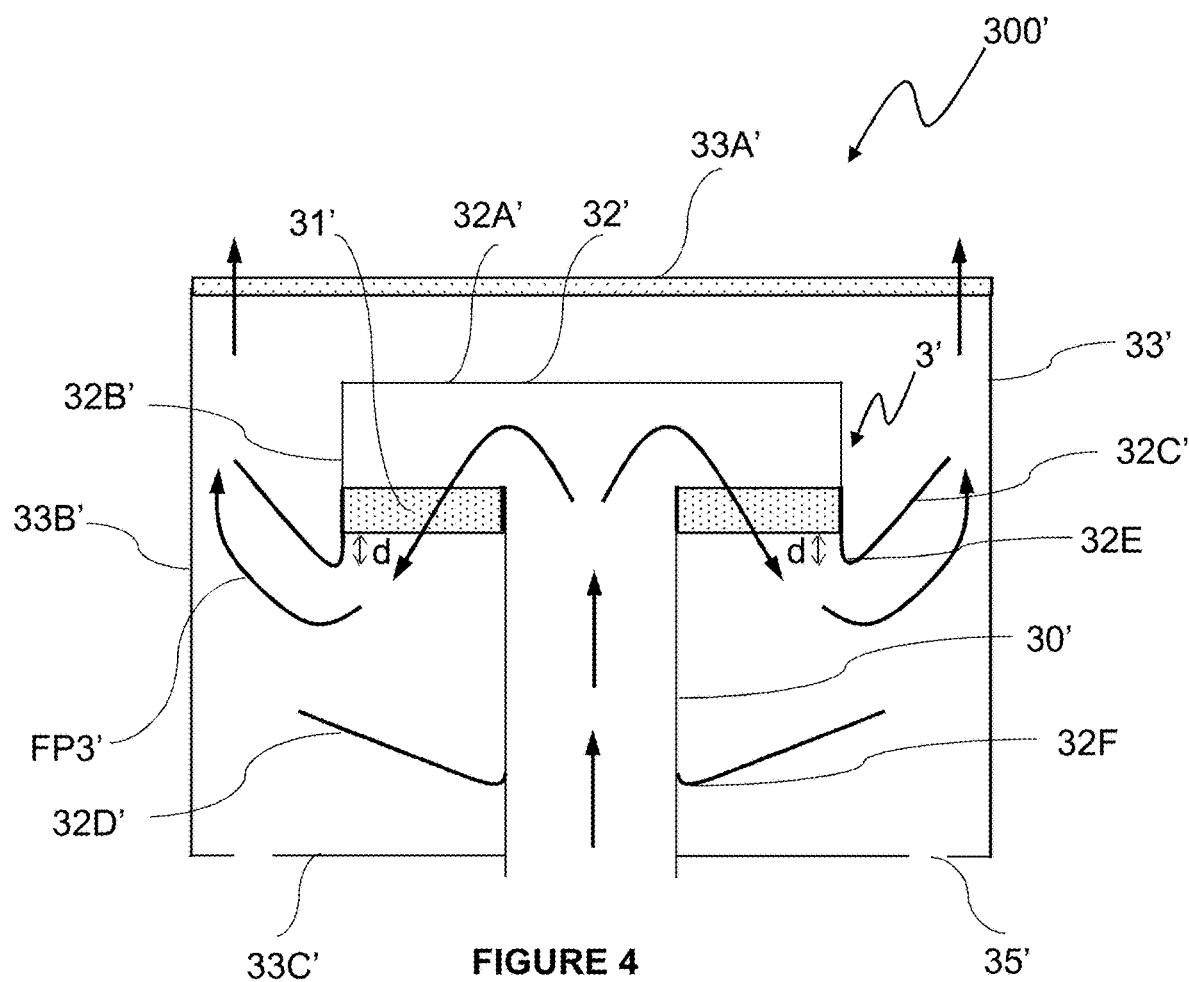
FIG. 4 is a schematic sectional view of a third embodiment of a vent assembly according to the invention.

Referring now to FIG. 4, there is shown a vent assembly 300' according to a third embodiment of the invention. As this vent assembly 300' is similar to that previously described in relation to FIG. 3, the same numeric indicators will be used but distinguished by use of a prime (').

The operation of the vent assembly 300' is substantially the same as for vent assembly 300 of FIG. 3. In contrast to the vent assembly 300, the vent assembly 300' comprises an optional baffle 32C' with a curved juncture 32E, and a baffle 32D' with a curved juncture 32F. The curved juncture 32E comprises an elongate portion which protrudes from the face of the flame arrester assembly 31' by a distance, d. The baffle 32C' extends endlessly around the circumference of the flow conduit 30'.

Advantageously, the curved juncture 32E of the baffle 32C' of the weather hood 32' provides an enhanced flow path FP3' for fluid to exit the vent assembly 300'. The flow of fluid follows the flow path FP3' provided in part by the peripheral baffle 32C' to direct the fluid to vent in a substantially vertical direction. Fluid flows from the flow conduit 30' and through the flame arrester assembly 31' where the fluid contacts the surface of the baffle 32C' to be directed in a substantially upward and vertical direction, out of the housing 33' and into the atmosphere.

Furthermore, the peripheral baffle 32C' provides a similar weather drainage mechanism. Rain water collects in the curved juncture 32E of the baffle 32C', which is prevented from entering the flame arrester assembly 31'. The baffle 32C' creates a weir system, as described above for FIG. 2 and also shown in FIG. 3, which overflows once full to allow water to drain out of the drainage ports 35'. As before, the peripheral baffle 32C' may comprise a short skirt or wall depending from a terminal edge to prevent fluid flowing along the under-surface of the baffle 32C'.

Figure 5A:
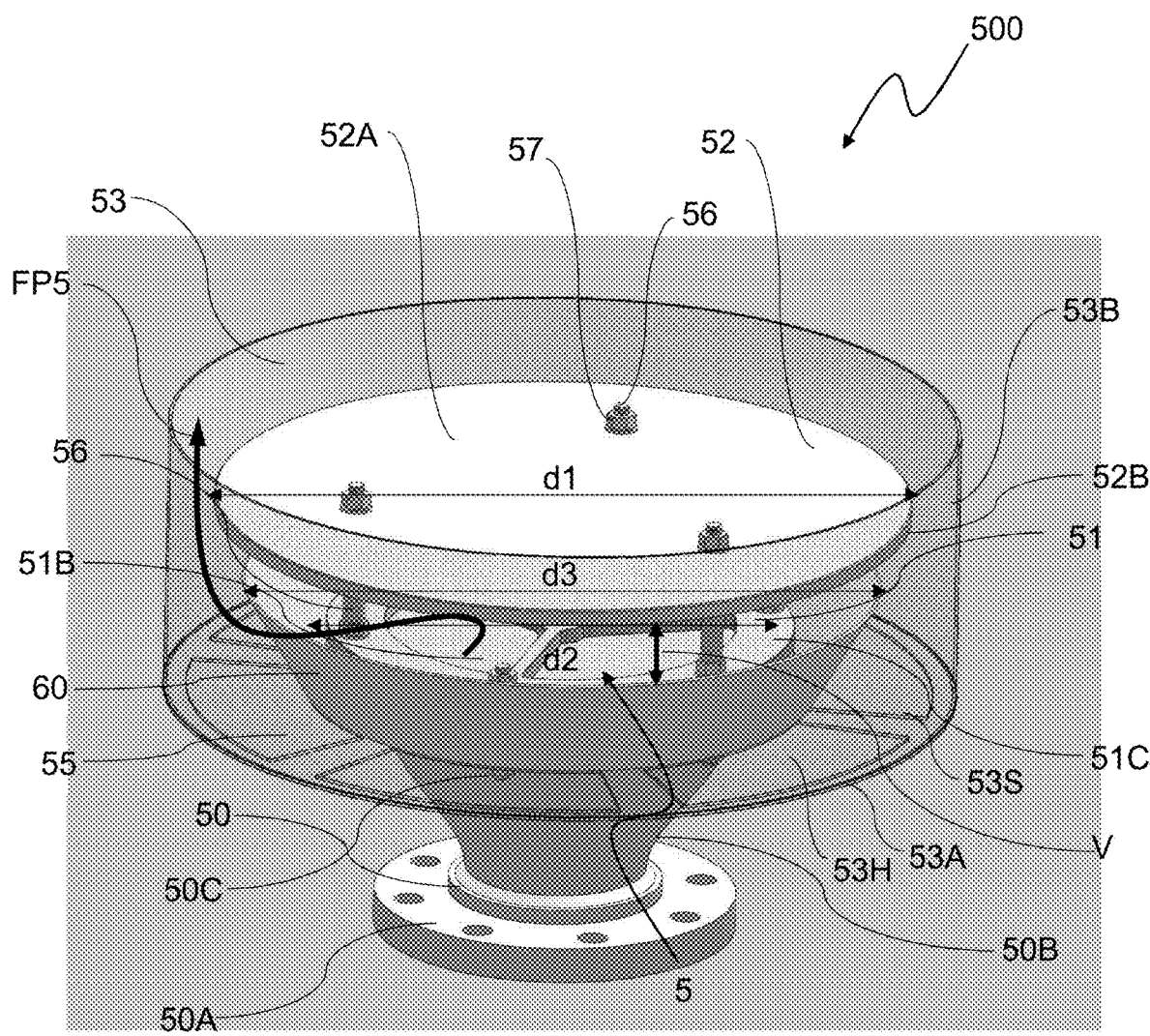
FIG. 5A is an isometric view of a fourth embodiment of a vent assembly according to the invention.
Figure 5B:
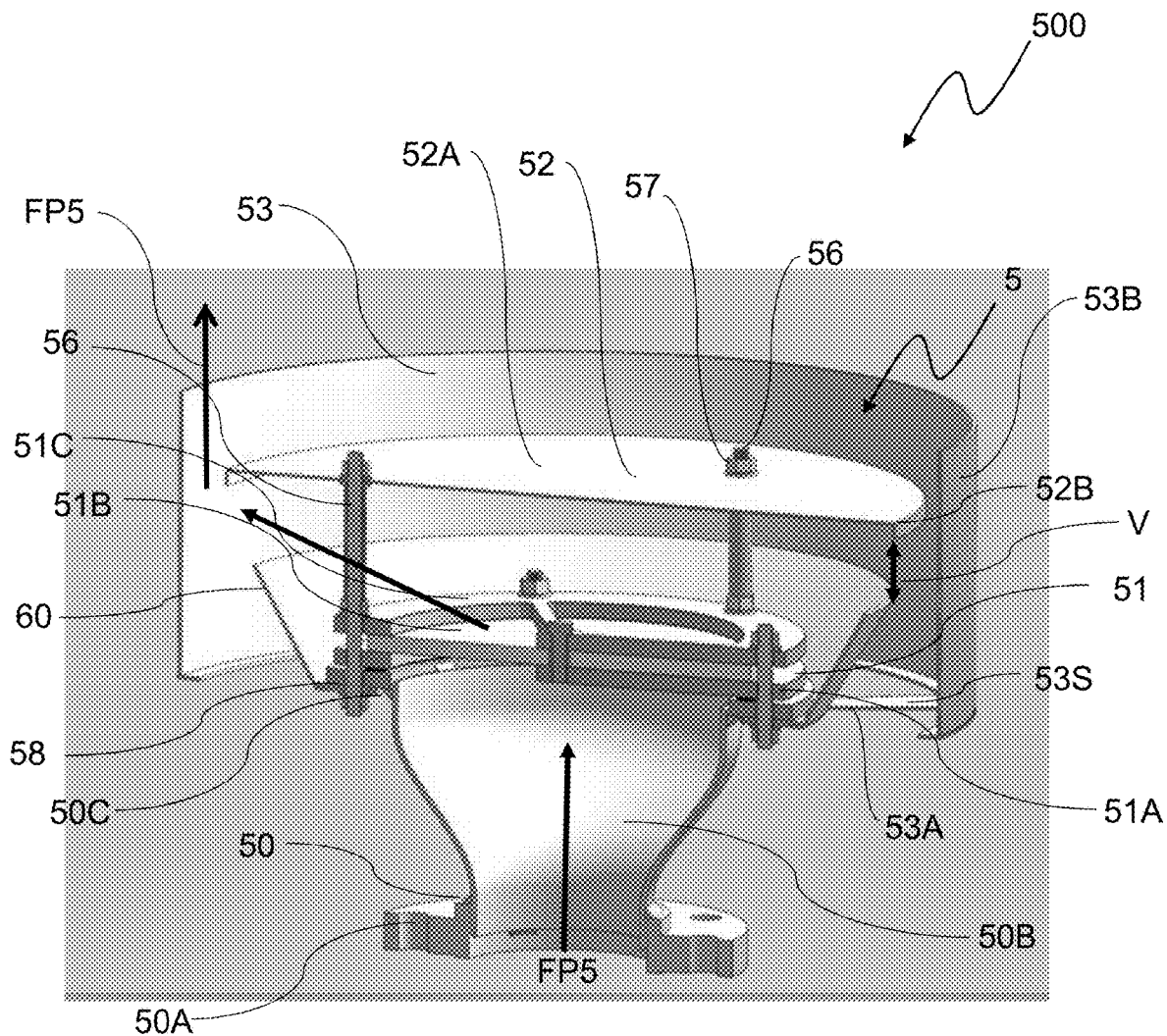
FIG. 5B is a sectional view of the fourth embodiment of a vent assembly according to the invention.

Referring now to FIGS. 5A and 5B, there is shown a vent assembly 500 according to a fourth embodiment of the invention. The vent assembly 500 comprises a flow conduit 50, a weather hood 52 and a housing 53. A flame arrester 5 comprising a flame arrester assembly 51 is optionally provided. The housing 53 is provided to house the terminal end of the flow conduit 50 and the flame arrester assembly 51 (if present).

The flow conduit 50 comprises a lower flange 50A at a proximal end thereof, a frusto-conical shaped body 50B and an upper flange 50C at a distal end thereof. The lower flange 50A is configured to be secured to a source of material to be vented (for example a tank having associated venting pipework) in order to afford fluid connection therebetween. Any suitable attachment means may be used, e.g. bolts.

If present, the flame arrester assembly 51 comprises a flame arrester element 51B, a first element support 51A and a second element support 51C. The flame arrester element 51B is sandwiched between the first element support 51A and the second element support 51C. The flame arrester element 51B is permeable to fluid flowing in either direction, into or out of the vent assembly 500.

In this embodiment, the weather hood 52 comprises a top portion 52A and an optional skirt portion 52B depending from the periphery of the top portion 52A. The top portion 52A is disc-like and is substantially circular in plan. The top portion 52A of the weather hood 52 is located within the vent assembly 500 to substantially cover, in plan, the flame arrester element 51B of the flame arrester assembly 51. It will be appreciated that the particular configuration and size of the weather hood 52 in embodiments is a matter of choice for the designer in order to achieve the shielding of the distal end of the flow conduit and/or flame arrester assembly from precipitation and to allow or ensure the appropriate flow of fluid. The skirt portion 52B may not be present, and instead, may be replaced with a perforated plate extending from the periphery of the weather hood 52 and towards the side wall 53B of the housing 53. The housing 53, flame arrester assembly 51 (if present) and weather hood 52 are secured to the upper flange 50C of the conduit 50 in part by common bolts 56.

As before, the weather hood 52 has a transverse dimension (e.g. a diameter) d1 and the flame arrester assembly 51 has a transverse dimension (e.g. a diameter) d2. In this embodiment, the diameter d1 of the weather hood 52 is greater than the diameter d2 of the flame arrester assembly 51, the ratio of d1:d2 is approximately say 1.3:1 to 1.9:1 or 2:1. Whilst it is possible for the transverse dimension d1 of the weather hood 52 to be less than the transverse dimension d2 of the flame arrester assembly 51 in this invention, it is not preferred.

There is further provided a baffle 60 which may be provided with drainage apertures (not shown) located proximate the flame arrester assembly 51 (if present). The drainage apertures (not shown) allow any collected water from draining therefrom.

The baffle 60 is frusto-conical in shape and provides an upstanding wall around the flame arrester assembly 51. The baffle 60 extends upwardly and away from the distal end of the flow conduit 50 and/or the flame arrester assembly 51. The baffle 60 may be secured to the upper flange 50C of the conduit 50 in common with the flame arrester assembly 51 and weather hood 52, that is, using common bolts 56 and nuts 57. It is also possible for the baffle 60 to be secured at a level that is lower than the flame arrester assembly 51.

The baffle 60 extends endlessly around the circumference of the side wall 52B of the weather hood 52 and extends away from the side wall 52B so as to define an acute angle with respect to a longitudinal flow axis along the conduit 50. The acute angle may be between 10 and 45 degrees, preferably between 15 and 30 degrees.

The distal edge of the baffle 60 has a transverse dimension (e.g. a dimeter) d3 which is greater than d2 but is preferably less than d1 such that the weather hood 52 shields the baffle 60 from impinging precipitation. In embodiments, the distal portion of the baffle 60 may extend outwardly and at an angle to the body of the baffle 60.

The vent assembly 500 includes a plurality of bolts 56 and corresponding nuts 57. The bolts 56 extend through apertures 58 provided in the upper flange 50C, through matched apertures in the first element support 51A and second element support 51C of the flame arrester assembly 51 to secure those components together. Advantageously, nuts 57 are provided to secure the bolts 56 such that the flame arrester element 51B is securely retained between the first element support 51A and second element support 51C. At least some of the bolts 56 have extensions which extend upwardly and engage with apertures formed in the weather hood 52 and are secured by nuts 57 to secure the weather hood 52 to the other components of the vent assembly 500. In embodiments, wherein the housing 53 comprises an at least partially solid top portion which extends across the top of the housing 53 (not shown), the bolts 56 may extend through the top portion of the housing 53 to further secure the housing 53 to the flame arrester assembly 51.

The top portion 52A of the weather hood 52 and the baffle 60 are separated by the bolts 56 within the vent assembly 500 and are spaced apart to provide a peripheral vent V.

The housing 53 provides an enclosure for the flame arrester assembly 51 and the weather hood 52. The housing 53 comprises a base portion 53A and a side wall 53B. In this embodiment, whilst no plated or other membered top portion is shown although it is understood that the vent assembly 500, and in particular the housing 53, may be provided with gauze or mesh or an at least partially imperforate top portion (not shown). Alternatively, the top portion is completely open, as shown, and the space between the weather hood 52 and the side wall 53B may be provided with a gauze, mesh or other perforate member.

In this embodiment, the side wall 53B of the housing 53 is cylindrical in shape. The side wall 53B covers the flame arrester assembly 51 and the weather hood 52 when viewed from the side, i.e. horizontally.

The base portion 53A is disc shaped and surrounds the flow conduit 50, which is situated in the centre of the base portion 53A. The base portion 53A comprises a plurality of drainage ports 55. In this embodiment, the drainage ports 55 comprise apertures 53H, which are formed in the base portion 53A to define spokes 53S. The base portion 53A may additionally comprise a gauze, e.g. a wire gauze covering. Alternatively, the base portion 53A may comprise a perforate plate.

Alternatively, the base portion 53A may comprise plural spokes or arms which extend from the conduit 50 to the side wall 53B, drainage ports 55 being provided between adjacent spokes or arms. The space between one or more adjacent spokes or arms may be occluded with a mesh or gauze material.

The flow path FP5 is shown for the flow of fluid into and out of the vent assembly 500. The flow path FP5 is defined by the flow conduit 50, the weather hood 52, the baffle 60 and the housing 53. Fluid may flow freely in either direction, into and/or out of the vent assembly 500 depending upon the pressure difference within the vent assembly 500 in comparison to the atmosphere.

The flow path FP5 is shown for fluid leaving the vent assembly 500 (out-breathing mode). In use, the fluid flows from the flow conduit 50 and through the flame arrester assembly 51. The flow path FP5 changes direction to flow upwardly and outwardly under the weather hood 52 and is directed upwardly by the baffle 60 and into the housing 53, which further changes the direction of fluid flow within the flow path FP5 as the fluid contacts the side wall 53B of the housing 53. The fluid in the flow path FP5 vents in a substantially vertical direction out of the housing 53 of the vent assembly 500.

The weather hood 52 is configured to protect the distal end of the flow conduit 50 and/or the flame arrester assembly 51 from water and debris that may ingress into the vent assembly 500. In normal operation, water and debris, e.g. rain water may freely enter housing 53. The drainage ports 55 provide a means for the water and debris to exit the housing 53. Advantageously, this prevents blockage of or damage to the flame arrester assembly 51, so that it can continue to function effectively. Also, because of the relatively large size of the drainage ports 55, a perforate top portion (not shown) to the housing 53 may not be required (because leaves and so on can fall through the apertures 53H) although may also be provided.

Advantageously, the optional side wall 52B of the weather hood 52 is appropriately shaped so as to provide a means to allow rain water to flow along the surface of the side wall 52B and be directed out of the housing 53 through the apertures 53H. If any rain water does flow into the baffle 60 towards the flame arrester assembly 51 then this may egress through the drainage apertures (not shown) in the base of the baffle 60.

The provision of apertures 53H and spokes 53S is advantageous because it reduces the overall weight of the housing 53.

In an alternative, the weather hood 52 may form part of, and be secured to, the housing 53, for example the weather hood 52 may be secured to the side wall 53B of the housing 53 by radial struts or supports. The space between the side wall 53B and weather hood 52 may be covered with a mesh, gauze or perforated plate to prevent debris from falling into the housing 53.

Alternatively, the side wall 52B of the weather hood 52 may further comprise a baffle (not shown), which extends circumferentially around the skirt portion 52B of the weather hood 52 so as to define an internal acute angle. In other embodiments, the side wall 52B of the weather hood 52 may not be present, instead the top portion 52A of the weather hood 52 may be extended to the side wall 53B of the housing 53 in a form of a perforated plate.

Figure 6:
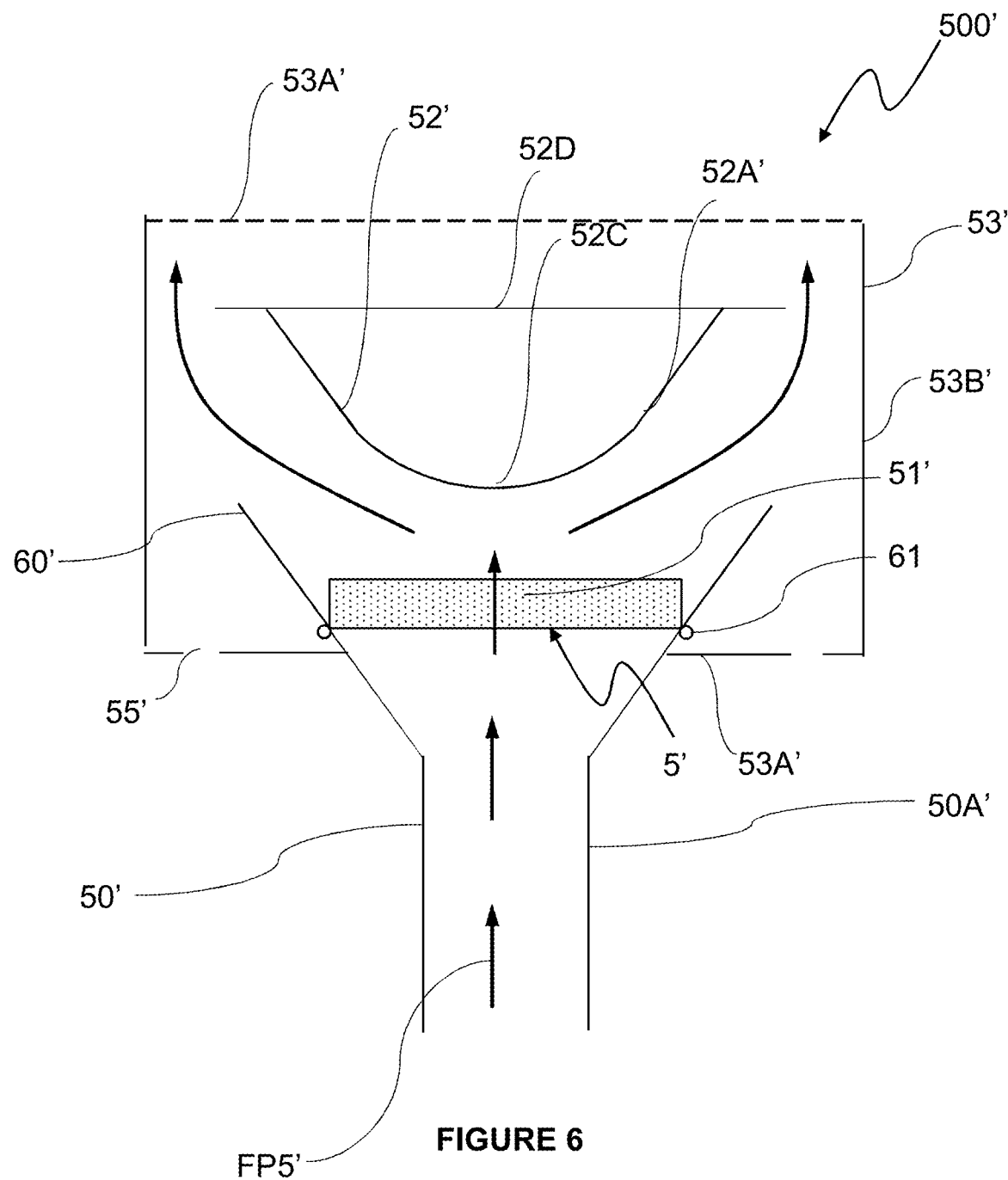
FIG. 6 is a schematic sectional view of a fifth embodiment of a vent assembly according to the invention.

Referring now to FIG. 6, there is shown a vent assembly 500' according to the fifth embodiment of the invention. As this vent assembly 500' is similar to that previously described in relation to FIGS. 5A and 5B the same numeric indicators will be used but distinguished by use of a prime ('). The vent assembly 500' comprises a flow conduit 50', a weather hood 52', and a housing 53'. A flame arrester 5' comprising a flame arrester assembly 51' is optionally provided. The housing 53' houses components of the vent assembly 500'.

In this embodiment, the top portion 52A' of the weather hood 52' of the vent assembly 500' is a convex dome shape. The centre of the convex dome 52C of the top portion 52A' faces, and is nearest to, the flame arrester assembly 51'. The top portion 52A' need not be a convex dome shape, and may be any other suitable convex shape. The top portion 52A' of the weather hood 52' may be closed by a plate member 52D to prevent precipitation from collecting within the concave surface of the weather hood 52'. The plate member 52D may be provided with a peripheral wall depending therefrom.

The housing 53' may optionally comprise a top portion 53A', which is located above the weather hood 52'. As before, drainage apertures 55' are provided to allow drainage of liquids collected within the housing 53'.

The dimensions of the weather hood 52' may be selected so as to shield the flame arrester assembly 51' from precipitation. Additionally, the baffle 60' may be provided with drainage apertures 61 so as to drain any fluid collected by or within the baffle 60' before it contacts the flame arrester assembly 51'. It will be appreciated that the conical angle of the baffle 60' may be selected or optimised according to the top portion 52A' of the weather hood 52'.

The flame arrester assembly 51' (if present), weather hood 52', baffle 60' and housing 53' may be secured as previously described.

The flow path FP5' is shown, in which fluid flows from the flow conduit 50', through the flame arrester assembly 51', through the housing 53' to vent into the atmosphere in an upward, vertical direction.

Advantageously, the housing 53' of this embodiment may significantly improve the flow path FP5' due to reduced flow restriction. The convex shape of the weather hood 52' guides the flow path FP5' to vent out to the atmosphere enabling the flow path FP5' to follow a path with no sharp turns involved, which facilitates the flow capacity of the vent assembly 500'.

In an alternative, the weather hood 52' may form part of, and be secured to, the housing 53', for example the weather hood 52' may be secured to the side wall 53B' of the housing 53' by radial struts or supports. The space between the side wall 53B' and weather hood 52' may be covered with a mesh or gauze or a perforate plate to prevent debris from falling into the housing 53'.

Figure 7:
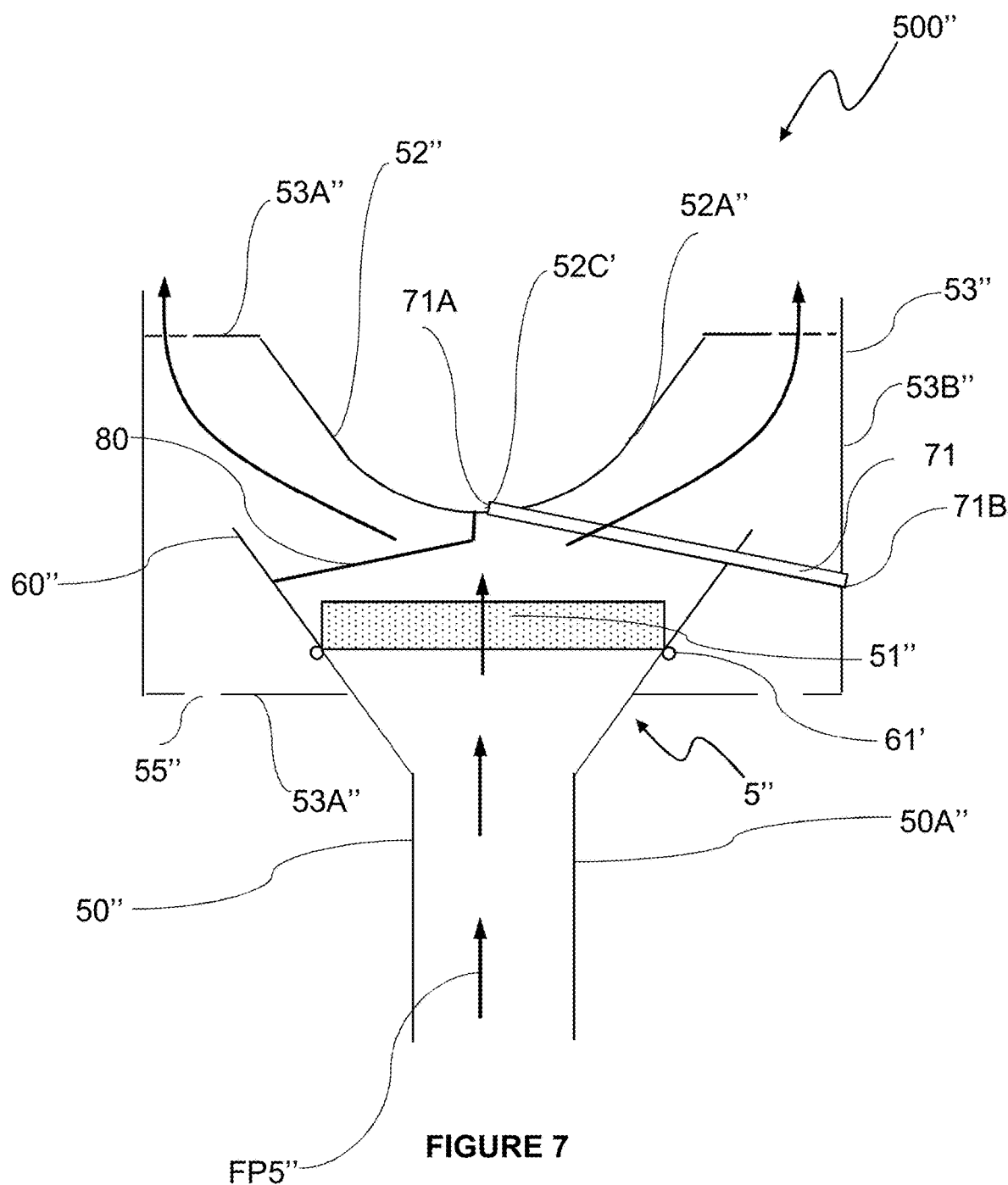
FIG. 7 is a schematic sectional view of a sixth embodiment of a vent assembly according to the invention.

Referring now to FIG. 7, there is shown a vent assembly 500" according to the sixth embodiment of the invention. As this vent assembly 500" is similar to that previously described in relation to FIG. 6 the same numeric indicators will be used but distinguished by use of an additional prime (').

In this embodiment, the weather hood 52" does not (but may) comprise a plate member (shown as 52D in FIG. 6). The top portion 53A" is located around the periphery of the weather hood 52", and extends circumferentially towards the side wall 53B" of the housing 53". The top portion 53A" may comprise apertures and/or is permeable to fluid. In embodiments, if the transverse diameter (od) of the weather hood 52" is larger than that of baffle 60", then the top portion 53A" may be a wire gauze or a perforated plate to be used as a bird screen. Otherwise, the top portion 53A" may comprise two parts, the part proximate to the side wall being a bird screen and the other part (adjacent the central part of the weather hood) being a solid horizontal plate.

The weather hood 52" has a convex dome shape. The weather hood 52" is further provided with a drainage tube 71. The drainage tube 71 comprises an inlet 71A and an outlet 71B. The inlet 71A of the drainage tube is preferably located below the centre of the convex dome 52C'. The outlet 71B of the drainage tube is located in the side wall 53B" of the housing 53", so that the drainage tube 71 extends from, and fluidly connected to, the centre of the convex dome 52C' to the outer surface of the side wall 53B" of the housing 53" to provide an open passage. The inlet 71A is located above the plane of the outlet 71B.

The drainage tube 71 may be formed from any suitable material that will not rust or otherwise degrade or deteriorate in the outdoor environment and which is chemically compatible with the venting gases.

In use, precipitation that would otherwise collect near the centre of the convex dome 52C' may drain away from the terminal end of the flow conduit 50" and the flame arrester assembly 51" (if present) through the drainage tube 71 via the inlet 71A to flow towards and out of the outlet 71B and into the external environment. Advantageously, precipitation that enters the housing 53" through the top portion 53A" may also flow out of the housing through the drainage ports 55".

There may be more than one drainage tube 71 provided. The drainage tube 71 may also be an open structure such as a channel along which fluids will flow. Advantageously, the drainage tubes 71 may be used to support the weather hood 52" within the housing 53". For example, the drainage tubes 71 may be formed from a suitably strong material to act as struts or spokes, to secure the weather hood 52" to the housing 53" and above the flame arrester assembly 51".

Alternatively, the outlet 71B of the drainage tube 71 may be located and terminate on or adjacent the wall of the baffle 60" to drain via aperture 61" or between the baffle 60" and the side wall 53B" so that rain water drains from the weather hood 52A", through the drainage tube 71 and through the drainage ports 55".

In circumstances where condensate or moisture forms on the inner surface of the weather hood 52" (or indeed on any of the weather hoods described above) it is possible to have a drain or drainage channel 80 extending from the under surface of the weather hood 52" to the baffle. The drain may comprise a wire or rod (i.e. a solid elongate object along which fluid will flow) or a pipe or channel (i.e. a body in and along which fluid can flow) which extends from the lowermost portion of the weather hood 52" and, preferably extends to a facing portion of the baffle 60", thereby to prevent any condensate from falling in to the flow conduit.

In any or all of the aforementioned embodiments, the drainage port may be of any suitable size, shape or arrangement and, for example, the drainage ports may comprise one way valves to allow egress of fluid from the housing but prevent ingress of fluid. Alternatively, in any of all of the aforementioned embodiments, the drainage ports may comprise apertures, for example large apertures, to facilitate air flow into the housing. The apertures are located in the base portion of the housing. The housing may be of any suitable shape and size, for example, the base portion may be planar or a convex or concave shape.

In any or all of the aforementioned embodiments, the components comprising the flame arrester assembly may be interchanged with any flame arrester assembly components known to those skilled in the art, for example, a crimped ribbon element, annular plate discs, perforated plate, wire gauze and so on. Moreover, the flame arrester element may be removed. Additionally or alternatively, the vent assembly may comprise a PRV, VRV, PVRV, pressure relief vent.

The various components of the invention may be made from suitable materials such as metal, for example steel, stainless steel, or any other suitably strong materials including plastics that are compatible with venting gases, and so on. In all embodiments, the flame arrester element may be formed from a porous matrix, for example a crimped ribbon. Other flame arrester elements known to the skilled person may be deployed.

It will be appreciated by those skilled in the art that several variations to the aforementioned embodiments are envisaged without departing from the scope of the invention.

It will also be appreciated by those skilled in the art that any number of combinations of the aforementioned features and/or those shown in the appended drawings provide clear advantages over the prior art and are therefore within the scope of the invention described herein.

The invention claimed is:

1. A vent assembly comprising a housing, a flow conduit and a weather hood, the flow conduit having a proximal end for being fluidly connected to a source of material and an open distal end, the housing having a base portion, a side wall portion, and a top portion, the flow conduit comprising a baffle located between the base portion and the top portion of the housing to direct fluid flowing from the flow conduit towards the weather hood and through the housing in a direction towards the top portion of the housing, wherein the weather hood has a transverse dimension greater than a transverse dimension of a distal edge of the baffle, wherein the baffle extends beyond the distal end of the flow conduit.

2. The vent assembly according to claim 1, wherein the baffle directs the fluid flowing from the flow conduit in a vertical direction and towards the top portion of the housing, optionally towards a periphery of the top portion of the housing.

3. The vent assembly according to claim 1, wherein the baffle extends endlessly around a periphery of the flow conduit.

4. The vent assembly according to claim 1, wherein the flow conduit comprises a flange located at or adjacent the distal end and the baffle is secured to the flange.

5. The vent assembly according to claim 1, wherein the flow conduit comprises a tubular portion of constant cross section and the baffle extends outwardly around the tubular portion.

6. The vent assembly according to claim 1, wherein an internal angle defined between the flow conduit and the baffle is acute.

7. The vent assembly according to claim 1, wherein the baffle is provided with or comprises one or more baffle drainage ports.

8. The vent assembly according to claim 1, wherein the base portion of the housing comprises one or more drainage ports.

9. The vent assembly according to claim 1, wherein the weather hood has a flow conduit-facing face and an environment-facing face, and the weather hood further comprises a drainage channel or tube in communication with the environment facing face.

10. The vent assembly according to claim 1, wherein the weather hood is attached to the side wall portion of the housing, optionally connected by a perforate member and/or support bars.

11. The vent assembly according to claim 1, further comprising a flame arrester assembly.

12. The vent assembly according to claim 1, further comprising one or more of a pressure relief valve, a vacuum relief valve, a combined pressure relief/vacuum relief valve.

13. A vent assembly comprising a housing, a flow conduit and a weather hood, the flow conduit having a proximal end for being fluidly connected to a source of material and an open distal end, the housing having a base portion, a side wall portion, and a top portion, the flow conduit comprising a baffle located between the base portion and the top portion of the housing to direct fluid flowing from the flow conduit towards the weather hood and through the housing in a direction towards the top portion of the housing, wherein the weather hood has a transverse dimension greater than a transverse dimension of a distal edge of the baffle, wherein an open top of the housing is covered, at least in part by a gauze or mesh or plate comprises perforations or apertures.

14. A vent assembly comprising a housing, a flow conduit and a weather hood, the flow conduit having a proximal end for being fluidly connected to a source of material and an open distal end, the housing having a base portion, a side wall portion, and a top portion, the flow conduit comprising a baffle located between the base portion and the top portion of the housing to direct fluid flowing from the flow conduit towards the weather hood and through the housing in a direction towards the top portion of the housing, wherein the weather hood has a transverse dimension greater than a transverse dimension of a distal edge of the baffle, wherein the weather hood has a depending wall formed at or towards its periphery and the depending wall is provided with a secondary baffle, which is outwardly directed.

15. The vent assembly according to claim 14, wherein the secondary baffle extends outwardly around the entire depending wall.

16. The vent assembly according to claim 15, wherein an internal angle defined between the depending wall and the secondary baffle is acute.

17. The vent assembly according to claim 14, wherein the secondary baffle comprises one or more drainage apertures or drainage tubes or channels.

\* \* \* \* \*